United States Patent [19]
Bellows et al.

[11] Patent Number: 5,920,802
[45] Date of Patent: Jul. 6, 1999

[54] SYSTEM AND METHOD TO IMPROVE POWER DISTRIBUTION IN A COAXIAL CABLE AMPLIFIER

[75] Inventors: Alfred H. Bellows, Wayland; Walter J. Beriont, Lexington, both of Mass.

[73] Assignee: GTE Laboratories Incorporated, Waltham, Mass.

[21] Appl. No.: 09/095,111

[22] Filed: Jun. 10, 1998

Related U.S. Application Data

[60] Provisional application No. 60/049,307, Jun. 11, 1997.
[51] Int. Cl.⁶ ...................................................... H04H 1/14
[52] U.S. Cl. ............................. 455/3.3; 348/6; 340/310.1
[58] Field of Search .......................... 455/3.1, 3.3; 348/6; 333/100, 127, 136; 340/310.01; 359/132, 133, 150

[56] References Cited

U.S. PATENT DOCUMENTS 5,781,844   7/1998  Spriester et al. .................... 455/3.3

*Primary Examiner*—Andrew I. Faile
*Assistant Examiner*—Sam Huang
*Attorney, Agent, or Firm*—Leonard Charles Suchyt; Floyd E. Anderson

[57] ABSTRACT

A video distribution system with an optical-to-radio frequency conversion device that can be configured to reduce the amount of insertion loss introduced into the system and the number of hardware connections needed for the system's operation. A jumper module replaces protection fuses within the conversion device and isolates two of the device's output signal ports from the internal low frequency supply used to operated the device. The isolation permits the use of a single power inserter apparatus that provides the electrical power to downstream signal driving devices receiving the converted signal from the device.

8 Claims, 7 Drawing Sheets

SYSTEM AND METHOD TO IMPROVE POWER DISTRIBUTION IN A COAXIAL CABLE AMPLIFIER

This application claims benefit of Provisional Application 60/049,307 filed Jun. 11, 1997.

BACKGROUND OF THE INVENTION

The present invention relates to the field of power distribution, and more particularly to an apparatus for improving power distribution in a coaxial cable amplifier used to distribute video signals containing radio frequency (RF) power.

To distribute video signals for cable and satellite television broadcast, as well as video conferencing signals, two forms of electrical signal energy are used. A radio frequency (RF) signal to carry the video content information, and a low frequency (60 Hz) 60 Volt power signal that is used to provide power for downstream components (i.e., line extenders and amplifiers). The low frequency power signal provides electrical power to the downstream devices, allowing the RF signal to be distributed to a number of different receiving points.

Conventionally, in video signal distribution systems, video information received from an upstream video source is converted from an optical signal to the RF signal to aid in the signal's propagation. An optical-to-RF conversion device, such as a Broadband Telecommunication Node (BTN), receives the optical signal, converts it to an RF signal, and distributes the converted signal between a number of output ports.

FIG. 1 is a block diagram of a power distribution path in a BTN device 100 for converting optical video signal to an RF signal and distributing the converted signal. BTN device 100 includes a number of output ports (1, 3, 4, and OUT), a power input port 2, a signal input port (not shown), and a power supply 110. BTN device 100 further includes several fuses 112, 114, 116, 118, 120, and 122 that provide current protection for the power supply and the output signal lines of BTN device 100. Power supply 110 is a 1.5 amp internal supply that allows operation of BTN device 100 and distribution of the RF power to the output ports of BTN device 100.

FIG. 2 is a block diagram showing a low-power configuration of a video signal distribution system 200 using a BTN device 100 consistent with FIG. 1. In FIG. 2, BTN device 100 drives four lightly loaded outbound coaxial cable lines A, B, C, and D. Each coaxial cable has a load of about 3 amps in this low-power configuration and individually act as an output source for ports 1, 3, 4, and OUT. Port 2 acts as an input power port that is supplied with power from primary power module 210. In this configuration, power module 210 is a 15 amp supply that operates at a designed maximum of 13.5 amps. Each cable line A, B, C, and D draws approximately 3 amps and the BTN device 100 requires 1.5 amps. The configuration depicted in FIG. 2 is rarely achieved, however, because the loads connected to the cable lines rarely draw the same current and additional electrical power is often needed to drive the downstream devices coupled to BTN device 100.

FIG. 3 is a block diagram showing a typical configuration of a video signal distribution system 300 using BTN device 100 consistent with that shown in FIG. 1. In this configuration, coaxial cable lines A, B, C, and D draw a total of 20 amps, with an unbalanced current load distribution of 3, 5, 5, and 7, respectively. Cable lines A and B are connected together via fuses internal to BTN device 100 (i.e., as seen in FIG. 1) and are powered by power module 210, a 15 amp power supply that provides BTN device 100 with 9.5 amps via input port 2.

In this configuration and in order to accommodate the unbalanced loads drawn by cable lines A, B, C, and D, power to at least two of the output ports must be blocked and additional power needs to be inserted directly into the blocked lines to operate connected downstream loads. In FIG. 3, power inserters 230 and 232 are coupled to output ports OUT and 4, respectively, of BTN device 100. To operate power inserters 230 and 232, an auxiliary power module 220 is required for the electrical power source. In this configuration, the power for inserters 230 and 232 is supplied from power module 220 via a third power inserter 234.

Power inserters 232 and 230 provide the electrical power (i.e., 60 Volts) necessary to operate the downstream devices (i.e., amplifiers, etc.) previously described. These inserters, however, require additional connections and couplings to the cable lines. The couplings and additional connections often degrade the output signal and ultimately result in a weaker or less stable signal at an end receiving apparatus. This signal degradation or "insertion loss" is a significant problem when additional connections and lines are added to the distribution system because the final video signal received will be of a lower quality and strength.

FIG. 4 is a block diagram of an alternative configuration for distributing video signals using power line inserters. In this configuration, a fourth power inserter 236 is coupled to input port 1 and power module 210 and all the outbound cable lines have a balanced load requirement of 5 amps. Inserter 236 is added to ensure that the 5 amps supplied to port 1 is output through port 3. Again, BTN device 100 draws 1.5 amps from power module 210 which causes power module 210 to function at 11.5 amps or 77 percent of its rated operating capacity. Auxiliary power module 220 delivers 10 amps or 67 percent of its rated value.

The example depicted in FIG. 4 also introduces reliability problems into the distribution system. With the addition of the power inserter 236 into the system the electrical power source is located on the wrong side of the internal line protection fuse 116 shown in FIG. 1. If, for example, cable B is shorted, the fault will cause fuse 116, coupled to port 1, to open or a fuse within inserter 236 to blow. With either occurrence, the power to internal power supply 110 is interrupted because the power signal from primary power module 210 is blocked from entering port 1. This failure (i.e., the loss of one output signal from port 3) that should only affect 25 percent of the customers, actually affects 100 percent of the customers.

Each of the aforementioned options suffer problems because they are hardware intensive and require additional maintenance and equipment expenditures. Further, the added hardware and resulting connections increase the introduction of insertion losses to the cable lines and ultimately, result in greater signal degradation for the end users. In addition, the system, as a whole, operates with less efficiency and with potentially greater stress on the system's power supply modules.

There is therefore, a need for a solution that allows a video distribution system to operate more efficiently with a minimal risk of insertion loss introduced into the system. The solution should provide a video signal distribution system that can effectively distribute power RF signals converted from an optical source signal, and low frequency electrical signals required to operate downstream devices within the system. It is also desirable that the solution and a resulting distribution system not incur unnecessary hardware or maintenance expenses.

SUMMARY OF THE INVENTION

Systems and methods consistent with the present invention accomplish these goals and others by providing a BTN device that may be configured to operate without certain internal fuses. When configured, the BTN device includes a jumper module that couples two output ports such that the current load on the output ports is balanced without significant hardware additions or connections.

In accordance with the purpose of the invention as embodied and broadly described herein, a video signal distribution system consistent with the principles of the present invention is provided comprising: a primary power module; an optical to radio frequency conversion device having a plurality of signal ports and configurable such that at least two of the signal ports are isolated from an electrical power signal received from the primary power module; a power inserter apparatus coupled to one of the isolated signal ports and configured to provide a low frequency electrical signal to downstream devices receiving a RF signal output by the conversion device; and an auxiliary power module coupled to the power inserter apparatus and configured to provide the low frequency electrical signal to the power inserter apparatus.

A method, consistent with the principles of this invention, is also provided for configuring an optical to radio frequency conversion device to minimize a level of insertion loss introduced into a video distribution system. The video signal distribution system including a primary power module for supplying a first power source, an optical to radio frequency conversion device for receiving an optical video signal and outputting a RF signal and having a plurality of signal ports, and an auxiliary power module coupled to the optical to radio frequency device. The method comprises the steps of: configuring the conversion device to isolate at least two of the signal ports from the first power source received from the primary power module; and coupling one of the isolated signal ports to the auxiliary power module outputting a second electrical power source, the second electrical power source supplying power to downstream devices receiving the RF signal output by the conversion device.

This summary and the following detailed description should not restrict the scope of the claimed invention. Both provide examples and explanations to enable others to practice the invention. The accompanying drawings, which form part of the detailed description, show embodiments consistent with the invention and, together with the description, explain the principles of the invention.

DETAILED DESCRIPTION

The following description of implementations of this invention refers to the accompanying drawings. Where appropriate, the same reference numbers in different drawings refer to the same or similar elements.

Figure 1:
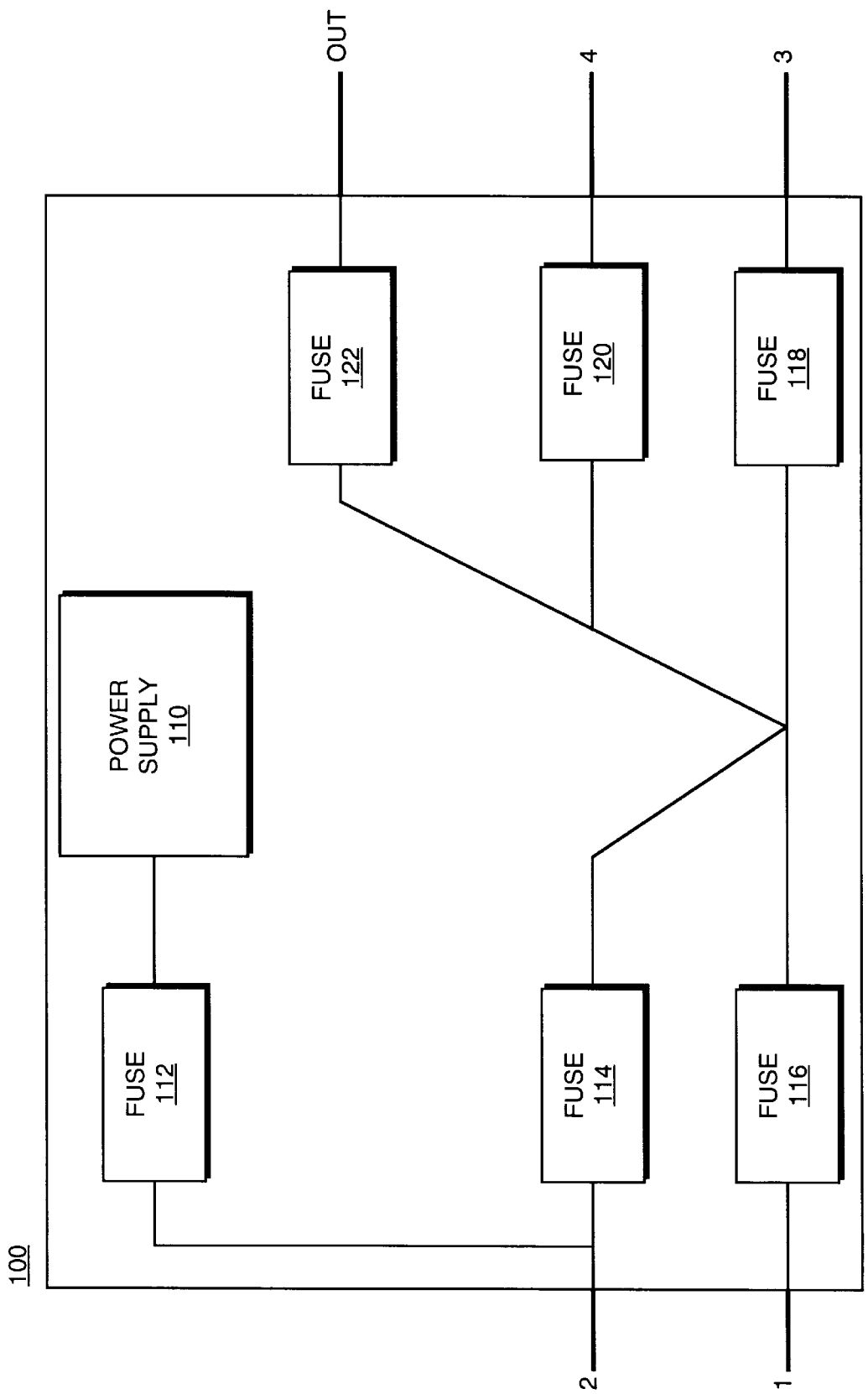
FIG. 1 is a block diagram of a power distribution path in a conventional BTN device used for converting optical video signals to RF signals to allow distribution.
Figure 2:
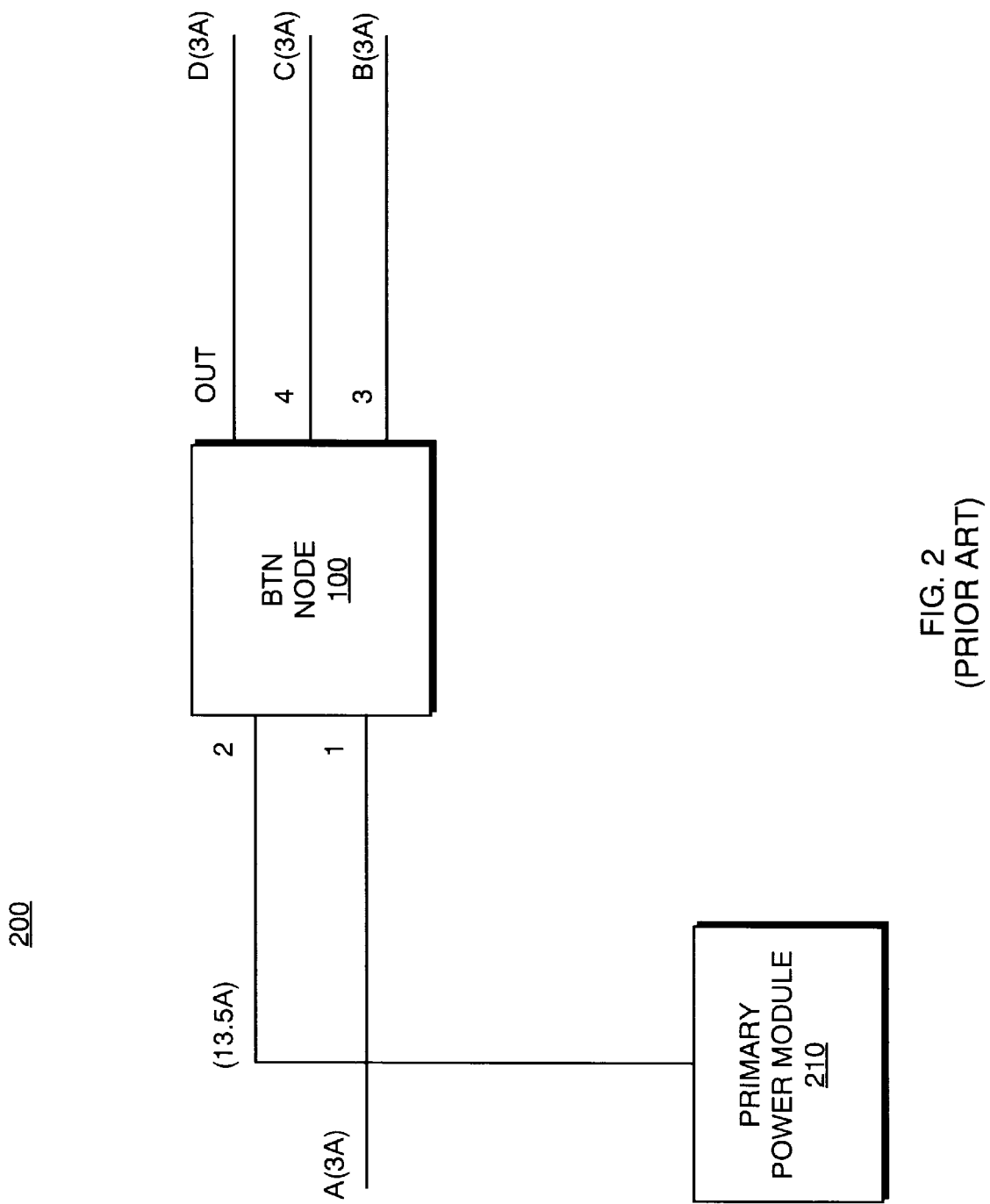
FIG. 2 is a block diagram showing a low-power configuration of a video signal distribution system using the BTN device of FIG. 1.
Figure 3:
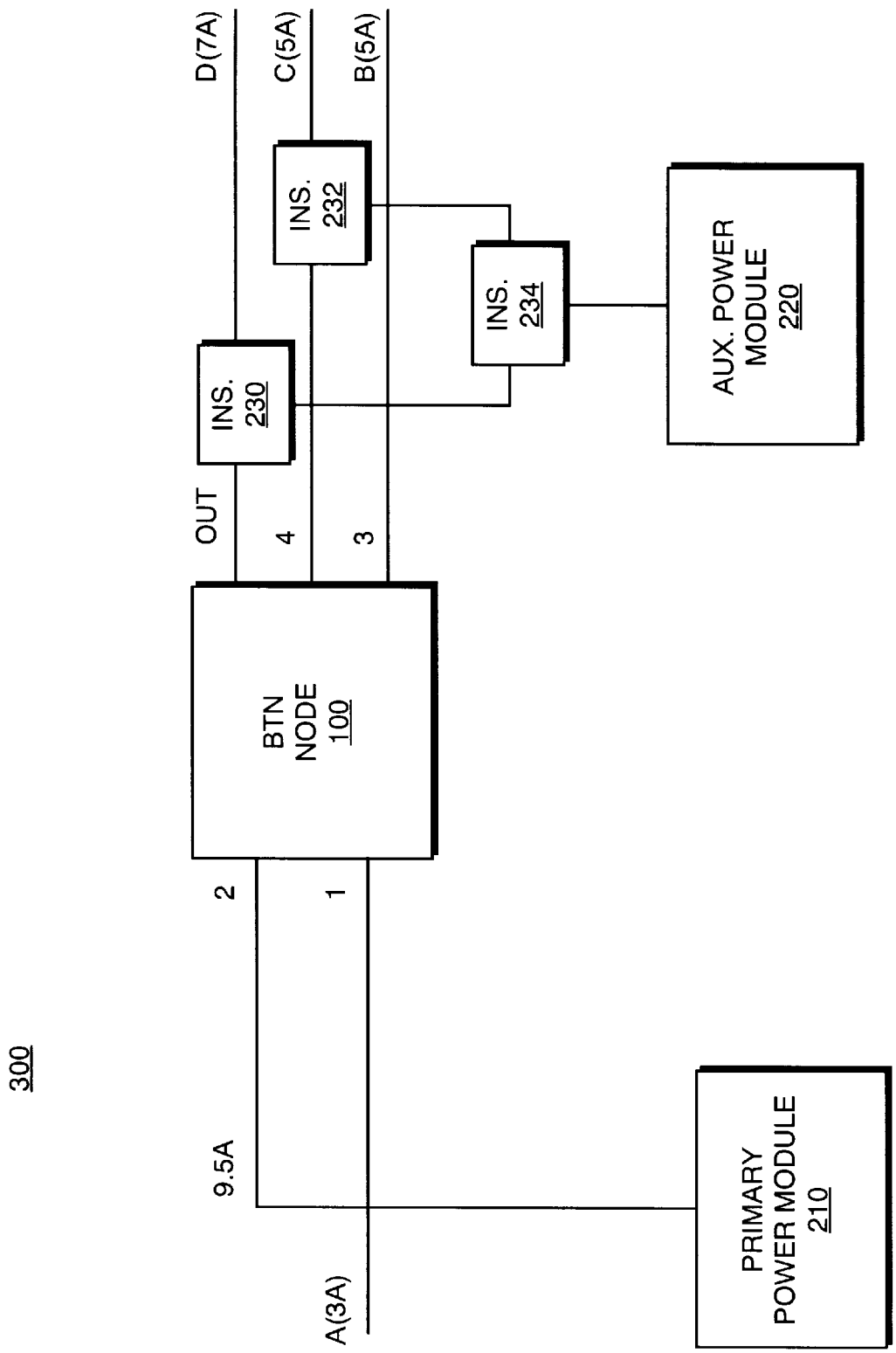
FIG. 3 is a block diagram showing a typical configuration of a video signal distribution system using the BTN device of FIG. 1.
Figure 4:
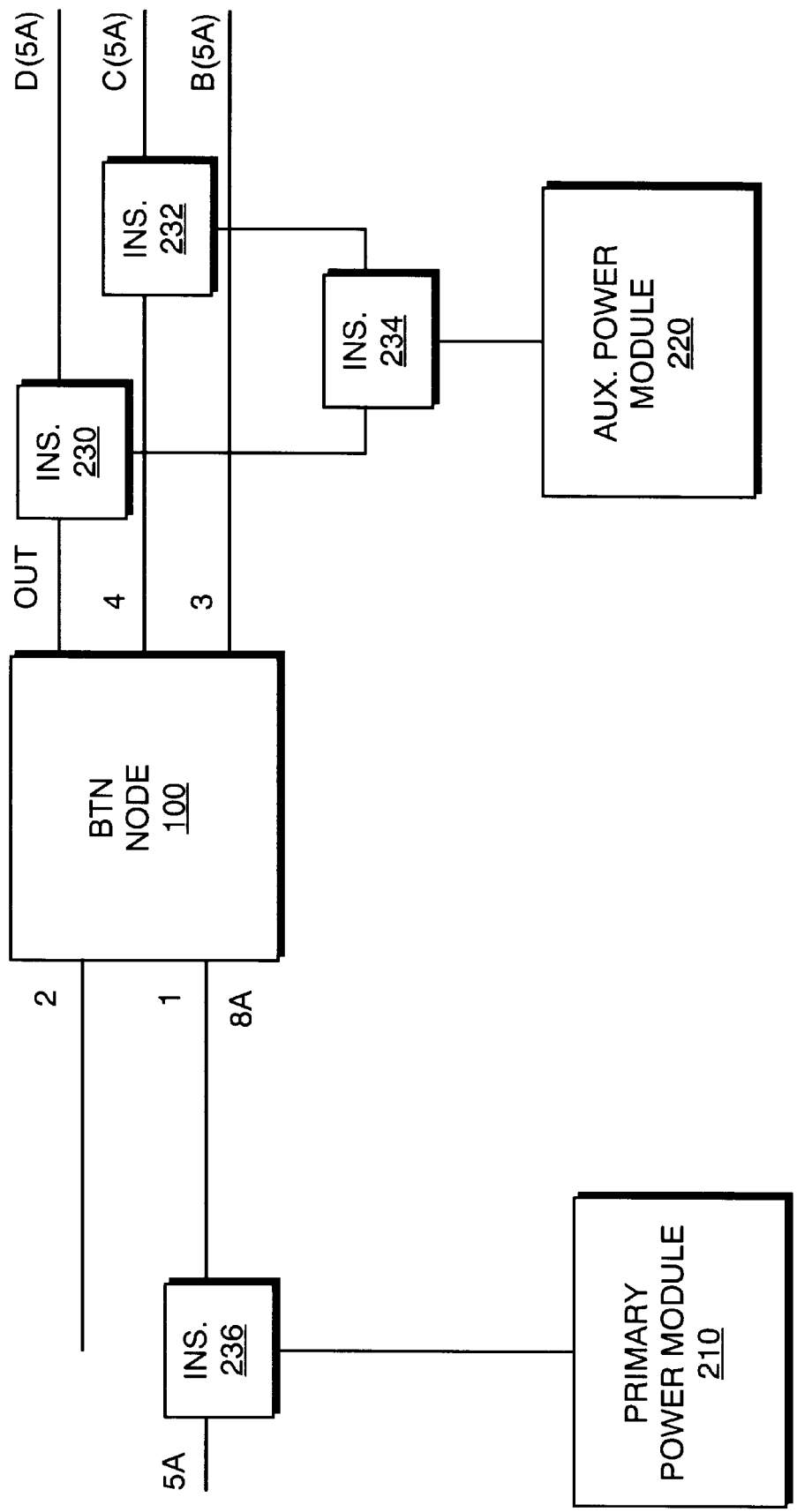
FIG. 4 is a block diagram showing an alternative system configuration for distributing a video signals using the BTN device of FIG. 1.
Figure 5:
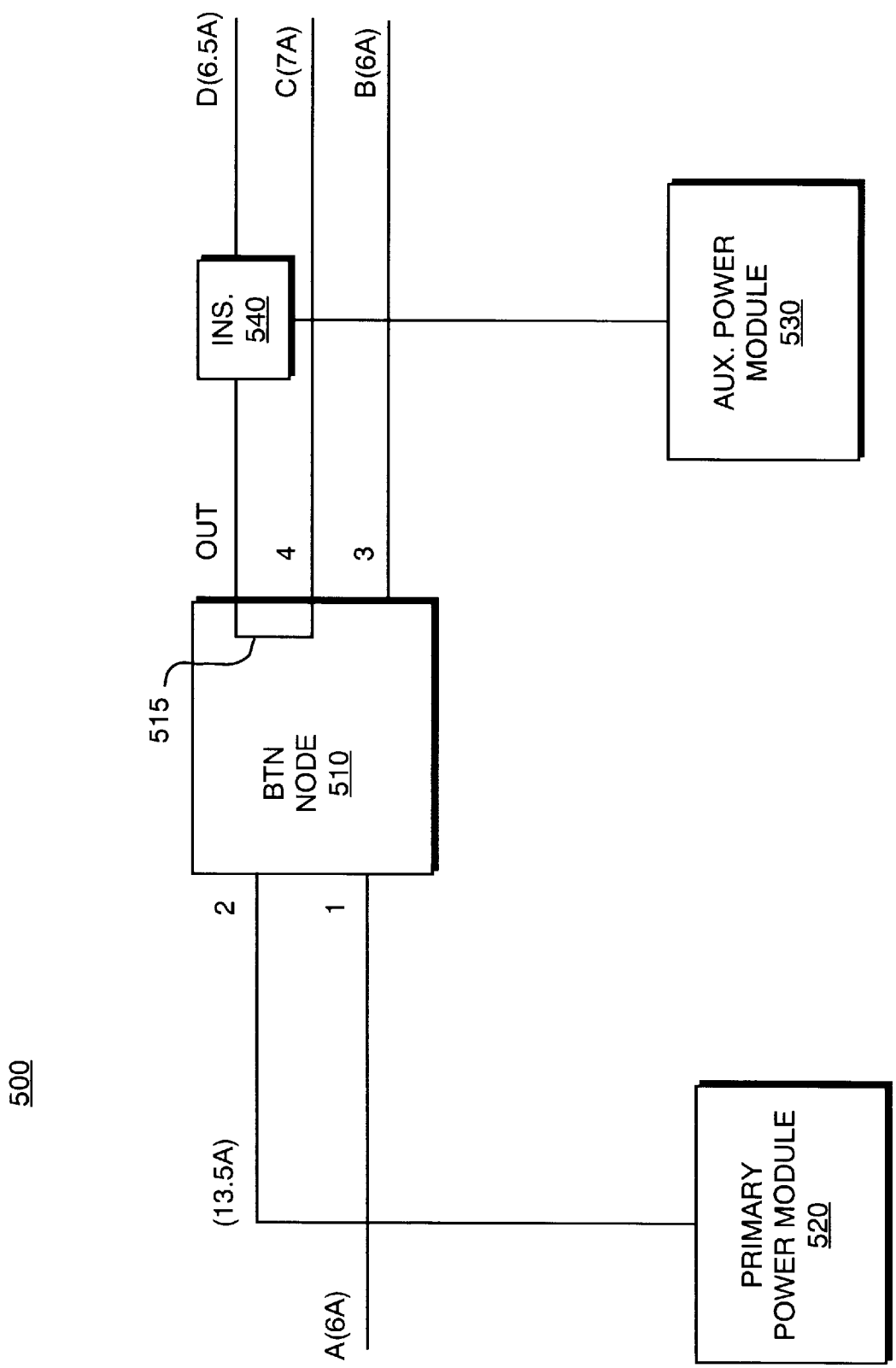
FIG. 5 is a block diagram of a video signal distribution system using a BTN device consistent with this invention.

FIG. 5 is a block diagram of a video distribution system 500 with a BTN device 510 configured to operate in accordance with the systems and methods of the present invention. System 500 includes a BTN device 510, a primary power module 520, an auxiliary power module 530, and a power inserter apparatus 540.

In this configuration, BTN device 510 drives four outbound coaxial cables lines A, B, C, and D via output ports 1, 3, 4, and OUT, respectively. BTN device 510 also includes at least one optical signal input port (not shown) that receives a video signal from an upstream video source. BTN device 510 receives its low frequency electrical energy source from primary power module 520 via power input port 2. Power module 520 is a 15 amp power supply that is designed to operate typically at 90 percent of its capacity, and supply 13.5 amps to BTN device and output loads on cable lines A and B.

As seen in FIG. 5, output port "OUT" is coupled to coaxial cable line D via power inserter 540. As previously stated, power inserter 540 inserts low frequency electrical power into the coaxial cable line D to drive downstream devices coupled on lines C and D. In this configuration, coaxial cable lines A, B, C, and D draw a relatively balanced load of approximately 6, 6, 7, and 6.5 amps, respectively.

For system 500 to operate with the above current loads, coaxial cable lines C and D attached to ports OUT and 4 are isolated from the 60 V internal bus (residing in BTN device 510 and supplied by power module 520), and coupled together via jumper module 515. Connecting coaxial cable lines C and D via jumper module 515 allows for the use of a single power inserter instead of multiple power inserters for the additional cable connections. The resulting system experiences a reduction in the number of connection couplings and ultimately a reduction of insertion loss introduced.

Figure 6:
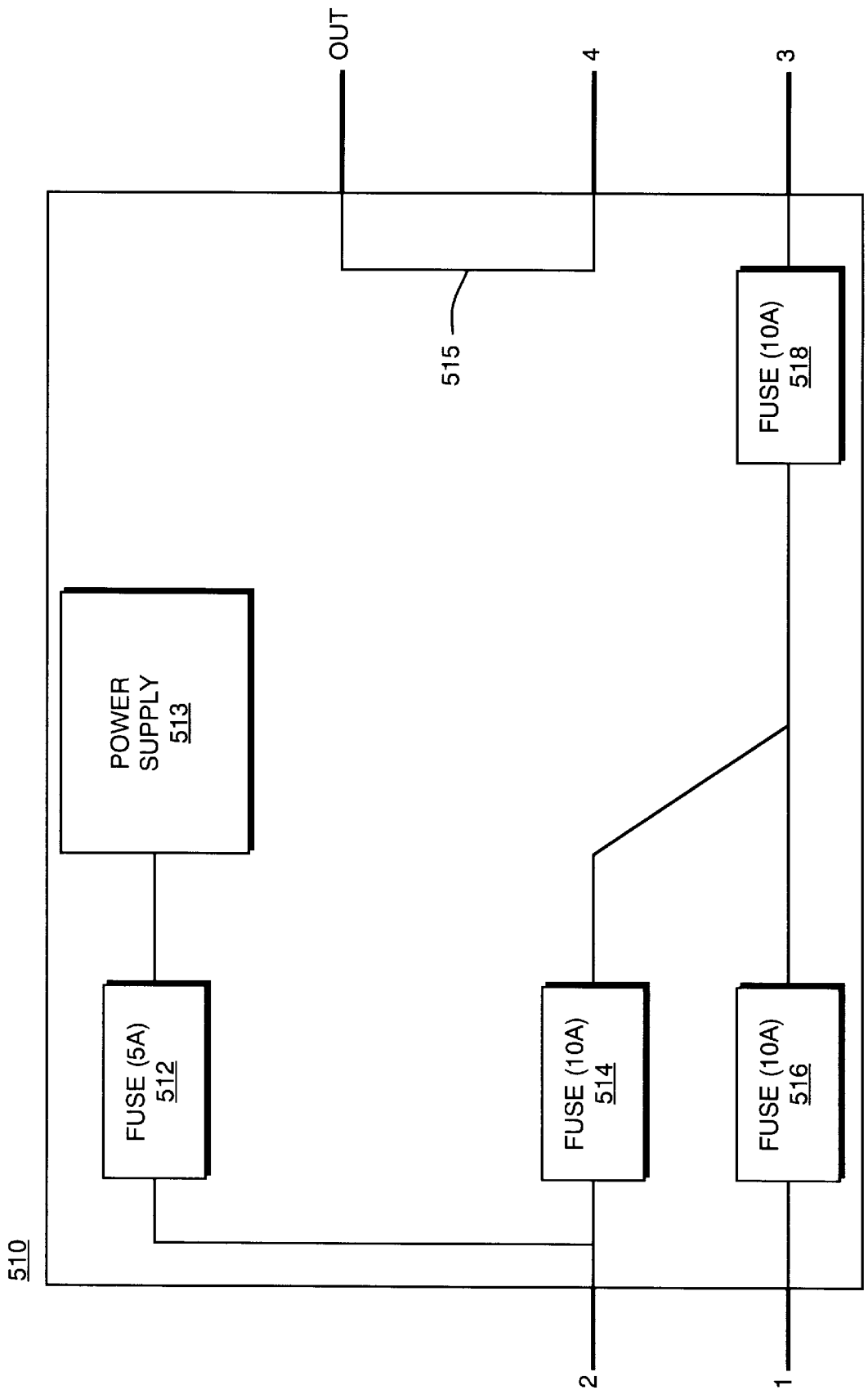
FIG. 6 is a block diagram of a BTN device configured to operate in conjunction with the video signal distribution system of FIG. 5.

FIG. 6 is a block diagram of a BTN device 510 for converting a received optical video signal to an RF signal and configured to distribute the converted signal consistent with the video distribution system of FIG. 5. BTN device 510 includes a number of ports (1, 2, 3, 4, and OUT) and an internal power supply 513. BTN device 510 further includes fuses 512, 514, 516, and 518 providing line protection for the output and input signal lines of BTN device 510. Power supply 513 is a 1.5 amp internal supply that allows operation of BTN device 510 and distribution of the RF power to the connected output ports of BTN device 510.

An optical-to-RF signal conversion device, Model BTN-S-75-SH, from General Instrument Corp. is an example of a conversion device that may be configured to operate in a manner consistent with the systems and methods of this invention.

In this implementation, fuse 512 is a 5 amp fuse that is coupled to internal power supply 513 and port 2 to provide over current protection for power supply 513. Fuses 514, 516, and 518 are preferably 10 amp line fuses that provide over current protection for the coaxial cable lines connected to ports 1, 2, and 3. As seen in FIG. 6, jumper module 515 is inserted in BTN device 510 such that ports OUT and 4 are coupled together. With the insertion of jumper module 515, the fuses normally coupled to ports OUT and 4 are removed and only a single power inserter is required.

Figure 7:
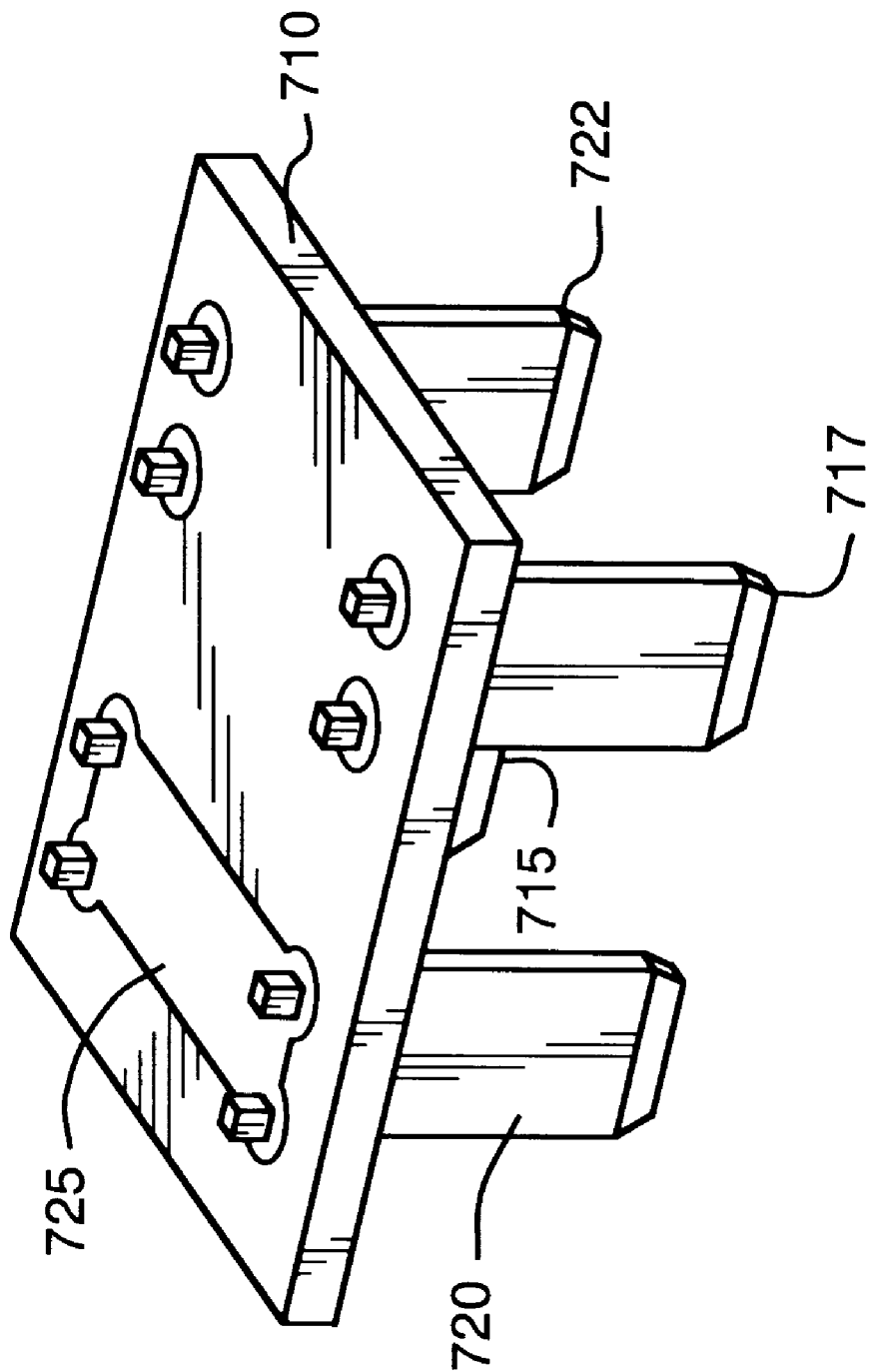
FIG. 7 is a diagram showing a jumper module for configuring a BTN device consistent with the present invention.

FIG. 7 is a diagram showing a jumper module 515 for configuring a BTN device consistent with the present invention. Jumper module 515 comprises a printed wiring board (PWB) 710 and two pair of insertion blades 715 and 720, and 717 and 722. Insertion blades 715 and 720 are electrically coupled via connection 725 on PWB 710, and each insertion blade 715, 717, 720, and 722 is spaced and sized such that they are able to fit into the sockets of the fuses removed from BTN device 510. Insertion blades 717 and 722 are not connected, but permit stable placement of module 515. Connection 725 also electrically couples the coaxial cables connected to port OUT and port 4 together.

Those skilled in the art will recognize that various modifications and variations can be made in the preceding examples without departing from the scope or spirit of the invention. For example, other ports could be coupled together with jumper module 515 without deviating from the spirit of the invention.

The specification does not limit the invention. Instead it provides examples and explanations to allow persons of ordinary skill to appreciate different ways to practice this invention. The following claims define the true scope and spirit of the invention.

What is claimed is:

1. A video signal distribution system comprising:
   a primary power module;
   an optical to radio frequency conversion device having a plurality of signal ports and configurable such that at least two of the signal ports are isolated from an electrical power signal received from the primary power module;
   a power inserter apparatus coupled to one of the isolated signal ports and configured to provide a low frequency electrical signal to downstream devices receiving a RF signal output by the conversion device; and
   an auxiliary power module coupled to the power inserter apparatus and configured to provide the low frequency electrical signal to the power inserter apparatus.

2. The system of claim 1, further comprising:
   a coaxial cable line coupled to each of the signal ports and configured to transmit the RF signal and the low frequency electrical signal to the downstream devices.

3. The system of claim 2, wherein the optical to radio frequency conversion device is configured to isolate the at least two signal ports with a jumper module inserted such that the coaxial cable lines coupled to the at least two signal ports are electrically connected.

4. The system of claim 3, wherein the conversion device further includes
   an input signal port configured to receive an optical video signal from an upstream video source, wherein the optical video is converted to the RF signal.

5. The system of claim 4, wherein the conversion device further includes
   a current limiting fuse for each of the plurality of signal ports, and wherein the jumper module replaces the current limiting fuse for each of the at least two isolated signal ports.

6. In a video signal distribution system including a primary power module for supplying a first power source, an optical to radio frequency conversion device for receiving an optical video signal and outputting a RF signal and having a plurality of signal ports, and an auxiliary power module coupled to the optical to radio frequency device, a method for configuring the conversion device to minimize a level of insertion loss introduced into the video distribution system, the method comprising the steps of:
   configuring the conversion device to isolate at least two of the signal ports from the first power source received from the primary power module; and
   coupling one of the isolated signal ports to the auxiliary power module outputting a second electrical power source, the second electrical power source configured to supply power to downstream devices receiving the RF signal output by the conversion device.

7. The method of claim 6, wherein the conversion device further comprises a current protection fuse coupled to each of the plurality of signal ports, and wherein the step of configuring includes the substeps of:
   removing the current protection fuse coupled to each of the at least two isolated signal ports; and
   inserting a jumper module in a space created by the removed current fuses to electrically couple the at least two isolated signal ports.

8. In a video signal distribution system including a primary power module for supplying a power source, an optical to radio frequency conversion device for receiving an optical video signal, outputting a RF signal, and having a plurality of signal ports and a current protection fuse coupled to each signal port, and an auxiliary power module coupled to the conversion device, an apparatus comprising:
   a printed circuit board; and
   a pair of insertion blades electrically coupled and attached to the printed circuit board, wherein the insertion blades isolate at least two of the signal ports from the power source received from the primary power module when the apparatus is inserted in the conversion device, and wherein the insertion blades are inserted into spaces created by removing the current fuse coupled to the isolated signal ports.

* * * * *